(12) United States Patent
Lee et al.

(10) Patent No.: US 9,239,763 B2
(45) Date of Patent: Jan. 19, 2016

(54) CONTAINER DATABASE

(71) Applicant: Oracle International Corporation, Redwood Shores, CA (US)

(72) Inventors: Jaebock Lee, Sunnyvale, CA (US); Kumar Rajamani, San Ramon, CA (US); Giridhar Ravipati, Foster City, CA (US); Andre Kruglikov, Atherton, CA (US); Sanket Jain, Sunnyvale, CA (US); Chandrasekharan Iyer, Foster City, CA (US); Philip Yam, San Carlos, CA (US); Yunrui Li, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/631,815

(22) Filed: Sep. 28, 2012

(65) Prior Publication Data

US 2014/0095530 A1 Apr. 3, 2014

Related U.S. Application Data

(60) Provisional application No. 61/707,726, filed on Sep. 28, 2012.

(51) Int. Cl.
*G06F 17/30* (2006.01)
*G06F 11/14* (2006.01)
*G06F 21/62* (2013.01)

(52) U.S. Cl.
CPC ...... *G06F 11/1471* (2013.01); *G06F 17/30566* (2013.01); *G06F 21/6218* (2013.01)

(58) Field of Classification Search
CPC .............. G06F 17/30; G06F 17/3056; G06F 17/30424; G06F 17/30315; G06F 17/30595; G06F 17/30607; G06F 17/30566
USPC ......................................................... 707/769
See application file for complete search history.

(56) References Cited

U.S. PATENT DOCUMENTS

| | | | |
|---|---|---|---|
| 6,804,671 B1 * | 10/2004 | Loaiza et al. | 711/200 |
| 7,822,717 B2 | 10/2010 | Kapoor et al. | |
| 8,364,648 B1 | 1/2013 | Sim-Tang | |
| 2002/0112022 A1 | 8/2002 | Kazar et al. | |
| 2003/0061537 A1 | 3/2003 | Cha et al. | |
| 2004/0267809 A1 | 12/2004 | East et al. | |
| 2005/0038831 A1 | 2/2005 | Souder et al. | |

(Continued)

OTHER PUBLICATIONS

Muhamnad Anwar "How to install Oracle 12c Multitenant Pluggable Database", Feb. 24, 2012.*

(Continued)

*Primary Examiner* — Etienne Leroux
*Assistant Examiner* — Cindy Nguyen
(74) *Attorney, Agent, or Firm* — Hickman Palermo Becker Bingham LLP; Marcel K. Bingham (57) ABSTRACT

A container database may contain multiple database dictionaries, each database dictionary defining a pluggable database. When database sessions are established on a container DBMS, each database session is given access to a pluggable database by establishing the respective database dictionary of the pluggable database as the database dictionary for that database session. Database commands issued through database session can only access the database objects defined in the database dictionary established for the database session.

25 Claims, 4 Drawing Sheets

(56) References Cited

U.S. PATENT DOCUMENTS

| | | | |
|---|---|---|---|
| 2007/0100912 A1 | 5/2007 | Pareek et al. | |
| 2007/0244918 A1 | 10/2007 | Lee et al. | |
| 2010/0318570 A1* | 12/2010 | Narasinghanallur et al. | 707/783 |
| 2011/0004586 A1 | 1/2011 | Cherryholmes et al. | |
| 2011/0060724 A1 | 3/2011 | Chan | |
| 2011/0087633 A1 | 4/2011 | Kreuder et al. | |
| 2011/0307450 A1 | 12/2011 | Hahn et al. | |
| 2012/0109926 A1 | 5/2012 | Novik et al. | |
| 2013/0085742 A1 | 4/2013 | Barker et al. | |
| 2013/0117237 A1 | 5/2013 | Thomsen et al. | |
| 2013/0212068 A1 | 8/2013 | Talius et al. | |
| 2014/0095452 A1 | 4/2014 | Lee et al. | |
| 2014/0095546 A1 | 4/2014 | Kruglikov et al. | |
| 2014/0164331 A1 | 6/2014 | Li et al. | |
| 2015/0254240 A1 | 9/2015 | Li et al. | |

OTHER PUBLICATIONS

Dominic Betts et al., "Developing Multi-Tenant Applications For The Cloud," 3rd Edition, Microsoft, 2012, 246 pages.

Rajeev Kumar et al., Oracle DBA, A Helping Hand, Container Database and Pluggable Database (CDB & PDB), retrieved from the internet on Dec. 4, 2013, 2 pages.

Preimesberger, Chris, "Oracle Profits Up, but Revenues Slip" Oracle, dated Sep. 20, 2012, 2 pages.

Anwar, Muhammad, "How to Install Oracle 12c Multitenant Pluggable Databases", Tech Support, last accessed from the internet on Oct. 12, 2014, 15 pages.

Oracle Base, Multitenant: Create and Configure a Pluggable Database (PDB) In Oracle Database 12c Release 1 (12.1), dated Jan. 8, 2014, 16 pages.

Garcia-Molina et al., "Database System Implementation", dated Jan. 1, 2000, 84 pages.

Francisco Munoz et al., "Oracle Database 12c Backup and Recovery Survival Guide", dated Sep. 24, 2013, 8 pages.

Das et al., "Albatross: Lightweight Elasticity in Shared Storage Databases for the Cloud Using Live Data Migration", Proceedings of the VLDB Endowment, vol. 4, No. 8, Copyright, dated 2011, 12 pages.

Anonymous: "Oracle-Base—Multitenant: Overview of Container Databases (CDB) and Pluggable Databases (PDB)", dated Mar. 3, 2014, 4 pages.

Anonymous, :An Oracle White Paper Oracle Database Appliance: Migration Strategies, dated Jun. 2012, 14 pages.

U.S. Appl. No. 13/830,349, filed Mar. 14, 2013, Interview Summary.

U.S. Appl. No. 13/830,349, filed Mar. 14, 2013, Final Office Action.

* cited by examiner

CONTAINER DATABASE

CROSS-REFERENCE TO RELATED APPLICATIONS; BENEFIT CLAIM

This application claims priority to U.S. Provisional Application No. 61/707,726, entitled CONTAINER DATABASE, filed on the equal day herewith by J. William Lee, et. al., the contents of which are incorporated herein by reference.

FIELD OF THE INVENTION

The present invention relates to database system consolidation.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Database consolidation involves distributing and sharing computer resources of a hardware platform among multiple databases. Important objectives of database consolidation include isolation, transportability, and fast provisioning. Isolation is the ability to limit an application's access to the appropriate database; an application is permitted access to a database while other applications are prevented access.

Transportability is another important objective. Transportability is the ability to efficiently move databases between hosts. Transportability facilities distribution of computer resources between databases being consolidated.

Fast provisioning is the ability to quickly deploy a database on a host. Fast provisioning facilitates transportability by enabling existing databases to be moved and/or copied to another host quickly. Fast provisioning also facilitates rapid deployment of new database to a host.

Discussed herein are approaches for consolidating databases that effectively meet these objectives.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Described herein are approaches to consolidating databases using a container database management system ("container DBMS") that manages a container database. The container database may contain multiple separate databases, which are referred to herein as pluggable databases. Each pluggable database is defined by its own separate database dictionary.

A database dictionary comprises metadata that defines database objects contained in a database. In effect, a database dictionary defines the totality of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A container database may contain multiple database dictionaries for each pluggable database, each such database dictionary defining the pluggable database. When database sessions are established on a container DBMS, each database session is given access to a pluggable database by establishing the respective database dictionary of the pluggable database as the database dictionary for that database session. Database commands issued through the database session can only access the database objects defined in the database dictionary established for the database session.

Database Systems

Embodiments of the present invention are used in the context of DBMSs. Therefore, a description of a DBMS is useful.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Database Dictionary and Database Data Storage

As indicated earlier, the database dictionary is central to a DBMS's management of a database. The database dictionary contains metadata that defines database objects physically or logically contained in the database. Database objects include tables, columns, data types, users, user privileges, and storage structures used for storing database object data. The database dictionary is modified according to DDL commands issued to add, modify, or delete database objects.

Figure 1:
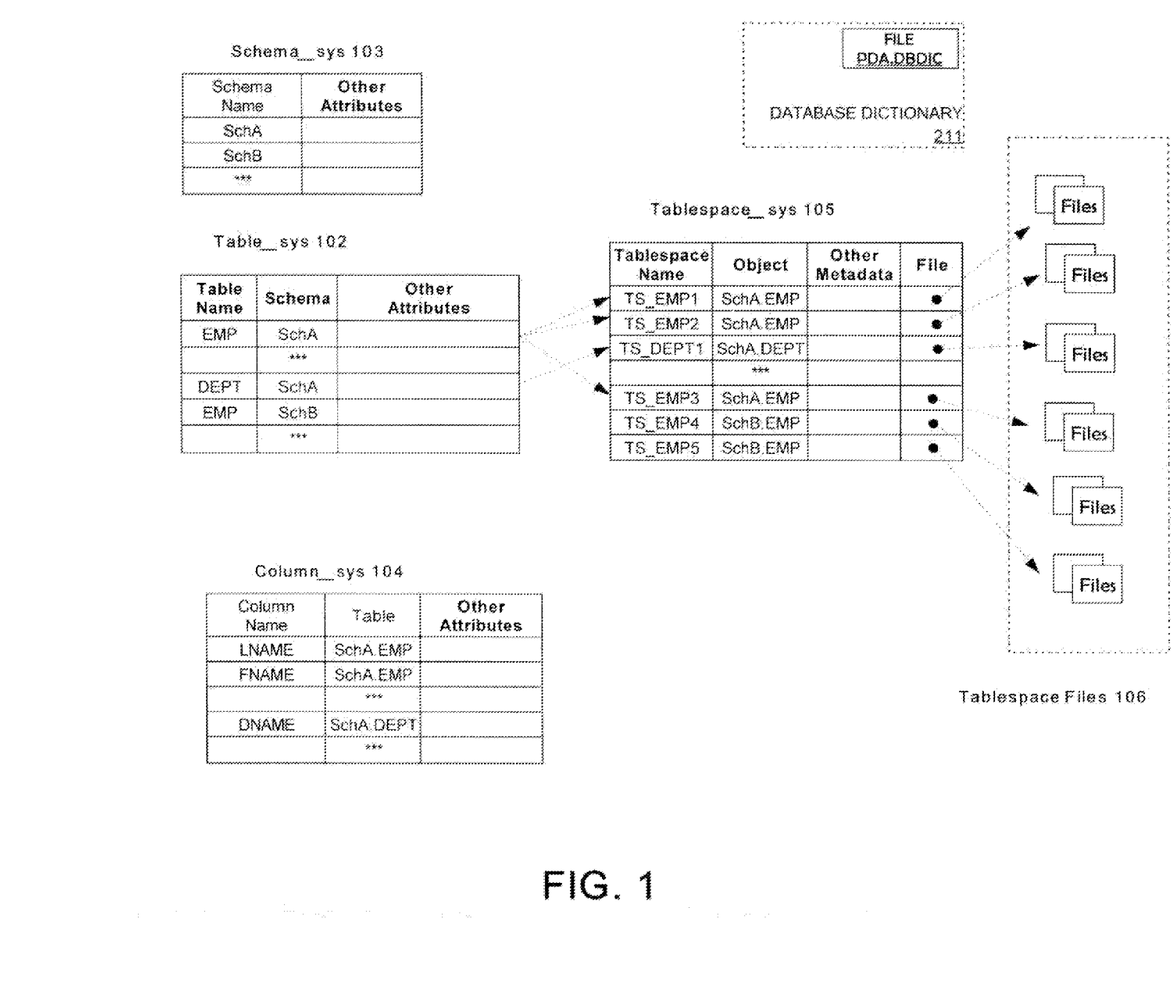
FIG. 1 is a diagram depicting a database dictionary according to an embodiment of the present invention.

FIG. 1 depicts a Database Dictionary 101. For purposes of exposition, only some aspects of Database Dictionary 101 and data structures contained therein are depicted in FIG. 1. Database dictionary 101 includes Table_sys 102, Schema_sys 103, Column_sys 104, and Tablespace_sys 105.

Table_sys 102 is a table that contains metadata that defines, at least in part, tables within a database. Table_sys 102 comprises (1) records that each define a table, and (2) attributes, each of which describe an aspect or property of a table. Among such attributes are Table Name and Schema. Table_sys 102 contains other attributes not specifically depicted in FIG. 1. Table Name is a name or label for a table, and Schema is the schema to which the table belongs. A schema is a defined and/or labeled set of database objects. One record in Table_sys 102 defines a table as having the name EMP and belonging to schema SchA. Another record defines a table as having the name DEPT and belonging to schema SchA. A third record in Table_sys 102 defines another table also as having the name EMP, but belonging to schema SchB.

Schema_sys 103 defines schemas. Schema_sys 103 has attribute Schema Name as well as other attributes. One record in Schema_sys 103 defines a schema having the name SchA; another record defines a schema having the name SchA.

Column_sys 104 is a table containing metadata defining column database objects. Column_sys 104 has attributes Column Name and Table, among other attributes. Column Name is a name or label for a column, and Table identifies a table to which a column belongs.

Tablespace_sys 105 is a table defining tablespaces. A tablespace is set of one or more files, or one or more portions of a file, or combination thereof, that is used to store data for database objects, such as data for a table or index. Each record in Tablespace_sys 105 defines a tablespace. Attributes of Tablespace_sys 105 each describes an aspect or property of a tablespace. The attribute Tablespace Name is a name or label for a tablespace. Attribute Object identifies a database object for which a tablespace stores data. Attribute File specifies one or more files that are in a tablespace. One record in Tablespace_sys 105 defines a tablespace as having the name TS_EMP1 and being used to store table EMP in schema SchA, as specified by the Object attribute value of SchA.EMP. Another record in Tablespace_sys 105 defines a tablespace as having the name TS_DEPT1 and being used to store data for table DEPT in schema SchA, as specified by the Object attribute value of SchA.EMP. Yet another record in Tablespace_sys 105 defines a tablespace as having the name TS_EMP4 and being used to store table EMP in schema SchB, as specified by the Object attribute value of SchB.EMP.

Database Dictionary 101 is expositive and illustrative of a database dictionary but not limiting. For example, a database dictionary may have more tables and attributes than those depicted for Database Dictionary 101. Other tables may define users, user privileges, and which user privileges are granted to which user. Furthermore, data structures of a database dictionary are not limited to tables, such as the tables depicted in FIG. 1

Storage of Database Dictionary Metadata

Metadata for a database dictionary is stored persistently in a dictionary store. A dictionary store may be, without limitation, one or more files, including a tablespace's file. When a database server is running, the database dictionary comprises, at least in part, one or more data structures in volatile memory ("in-memory data structures") that store at least a portion of metadata that is in the dictionary store. Such in-memory data structures are created and populated with metadata from a dictionary store when, for example, initializing a database server or instance for operation. Examples of in-memory data structures include tables depicted earlier, such Column_sys 104 and Table_sys 102.

Once the in-memory data structures are populated, the metadata in the in-memory data structures may be quickly accessed by database operations that require the use of a database dictionary, such as query evaluation. Populating the in-memory data structures is referred to herein as loading the database dictionary.

Namespace

A namespace is a domain in which names or labels of objects of a particular type must be unique for objects of that type. Database Dictionary 101 includes several different namespaces.

One such namespace is the namespace for a table. The namespace for a table is bounded by a schema. A name of a table is unique between names of other tables belonging to the schema. The namespace for a column is bounded by a table. A column name is unique among other columns names for a table.

For a schema and a tablespace, the namespace is bounded by a database, as defined by Database Dictionary 101. A name of a schema is unique between names of other schemas defined by Database Dictionary 101. A name of a tablespace is unique between names of other tablespaces defined by Database Dictionary 101. Note that even though tablespaces TS_EMP1, TS_EMP2, TS_EMP3, TS_EMP4, TS_EMP5 store data for tables named EMP, the tablespaces's namespace require that the tablespaces have unique names.

Container Database

Figure 2:
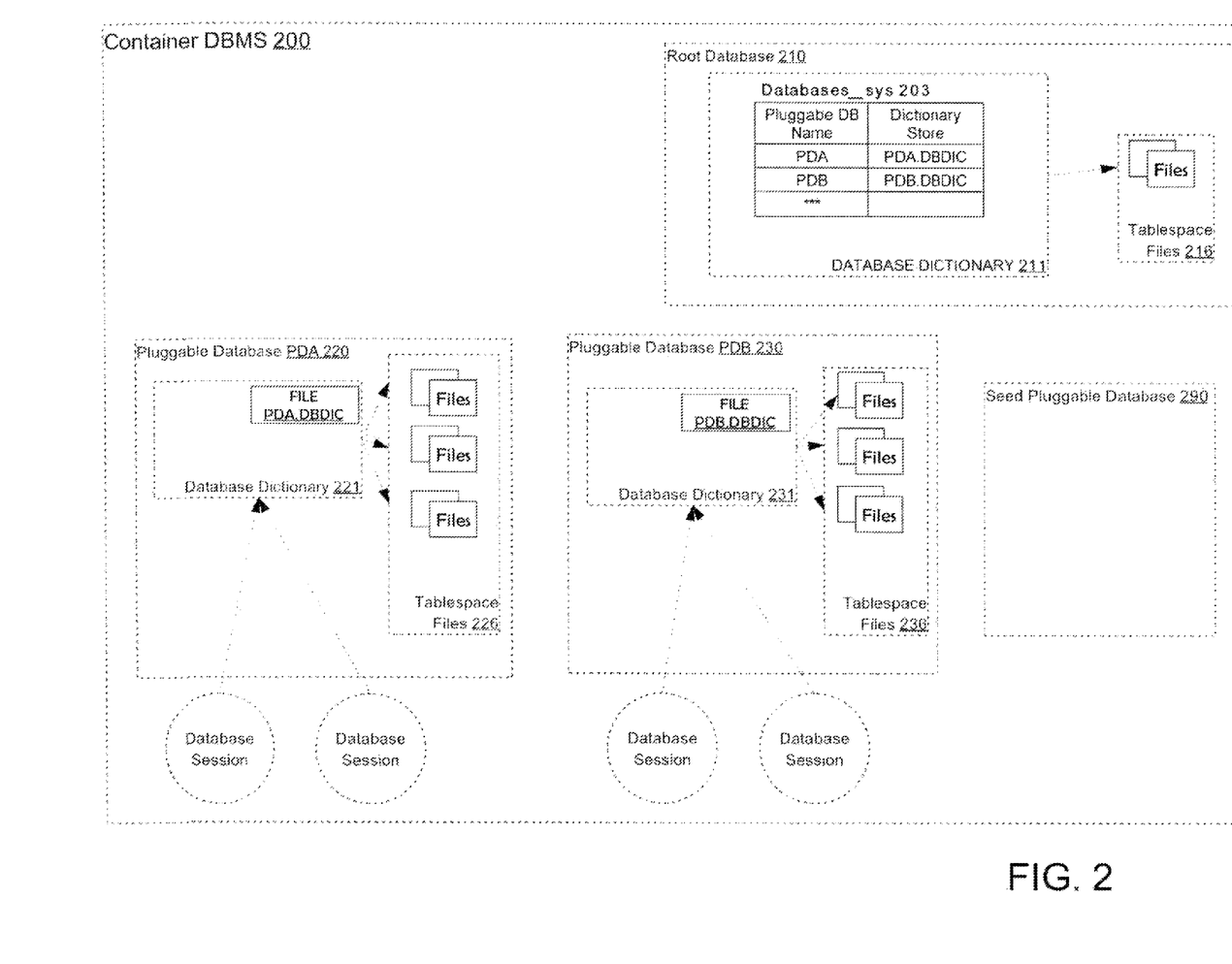
FIG. 2 is a diagram depicting a container database according to an embodiment of the present invention.
Figure 3:
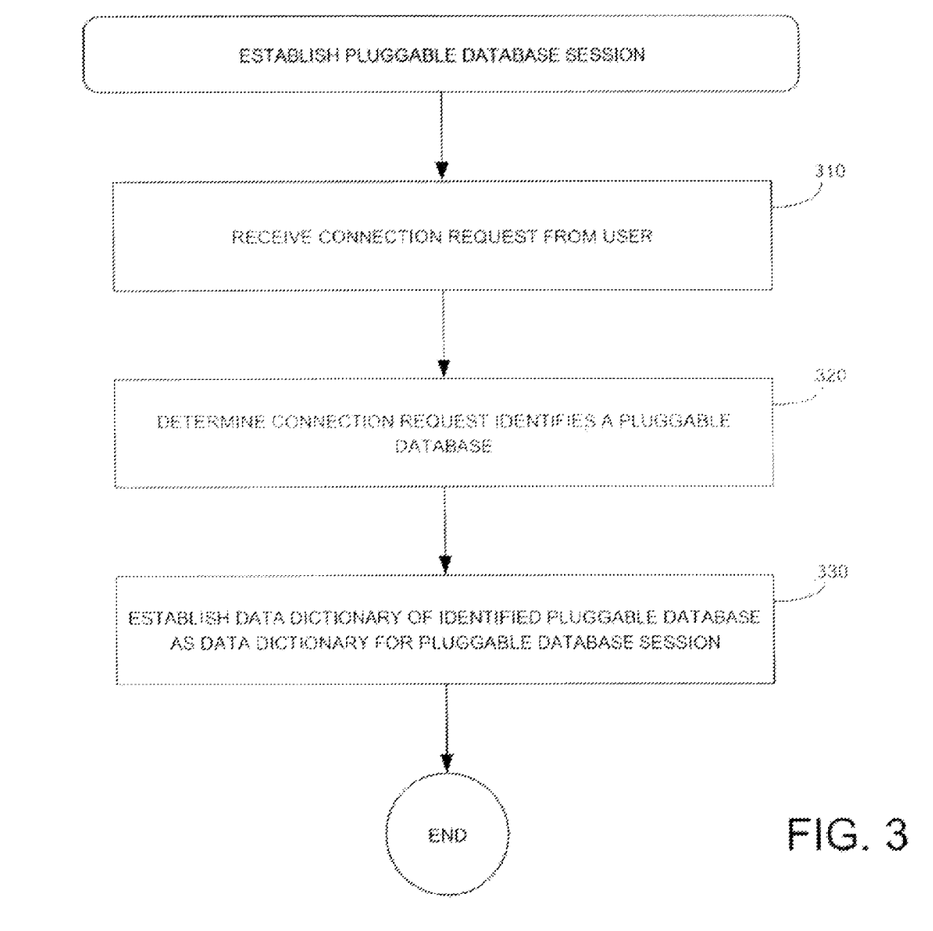
FIG. 3 is a flowchart showing operations performed for establishing a database session with a pluggable database.

FIG. 2 depicts a Container DBMS 200, a container DBMS according to an embodiment of the present invention. Container DBMS 200 contains multiple databases that are hosted and managed by a database server. The databases include Pluggable Database PDA 220 and Pluggable Database PDA 230, and Root Database 210, which is associated with Pluggable Database PDA 220 and Pluggable Database PDA 230, as shall be explained in greater detail. Pluggable databases and the associated root database, such as Pluggable Database PDA 220, Pluggable Database PDA 230 and Root Database 210, are collectively referred to herein as a container database. A container DBMS may contain more pluggable databases than the number of pluggable databases that are depicted in FIG. 3. Root Database 210 is a database used to globally manage Container DBMS 200, and to store metadata and/or data for "common database objects" that are accessible to users of multiple pluggable databases.

Referring to FIG. 2, Pluggable Database PDA 220 includes Database Dictionary 221. Data for database objects of Pluggable Database PDA 220 is stored in Tablespace Files 226. Similar to user data, metadata for a database dictionary is stored persistently in a dictionary store. Metadata contained in Database Dictionary 221 is stored in file PDA.DBDIC.

Pluggable Database PDB 230 includes Database Dictionary 231. Tablespace Files 236 store data for database objects of Pluggable Database PDB 230. Metadata for a Database Dictionary 231 is stored persistently in file PDB.DBDIC.

A database dictionary of the pluggable database may be referred to herein as a pluggable database dictionary. A database object defined by a pluggable database dictionary that is not a common database object is referred to herein as a pluggable database object.

Pluggable Database Session

A user may access a pluggable database within Container DBMS 200 by establishing the respective pluggable database dictionary of the pluggable database as a database dictionary for the database session. Once the pluggable database dictionary is established as a database dictionary of the pluggable database, access is isolated to the database objects of the pluggable database, and to common database objects of the root database, as shall be described in further detail. A pluggable database dictionary is established for a database session by a database server in response to a connection request from the user for the pluggable database. Establishing the pluggable database dictionary as a database dictionary for a database session may be referred to herein as attaching the database dictionary.

With respect to the pluggable database objects in the one or more pluggable databases of a container database, execution of database commands issued to a database session attached to a pluggable database dictionary can only access pluggable database objects that are defined by the pluggable database dictionary. Consequently, users of the database session can only access pluggable database objects that are defined by the attached pluggable database dictionary, thereby isolating database access to pluggable database objects to those in the respective pluggable database. This isolation not only applies to end users but may also to administrators of a pluggable database.

For example, in response to a connection request for access to Pluggable Database PDA 220, Database Dictionary 221 is attached to the database session. Database commands issued in the database session are executed against Database Dictionary 221. Access to pluggable database objects through DML commands issued in the database session is isolated to pluggable database objects defined by Database Dictionary 221. Isolation by concurrently executing database sessions with Pluggable Database PDA or Pluggable Database B is achieved in the same manner.

Root Database

Root Database 210 is a database used to globally manage Container DBMS 200. An important function facilitated by Root Database 210 is to define pluggable databases within Container DBMS 200. Similar to pluggable databases, Root Database 210 includes Database Dictionary 211. The database dictionary of a root database may be referred to herein as a root database dictionary. Database Dictionary 211 contains metadata that defines various aspects of Container DBMS 200 needed to administer Container DBMS 200 and the pluggable databases contained therein. Data for database objects defined by Database Dictionary 211 is stored in Tablespace Files 216.

Database Dictionary 211 includes Database_sys 203. Database_sys 203 defines pluggable databases within Container DBMS 200. Attributes of Database_sys 203 each describes an aspect or property of a pluggable database. The attribute Pluggable DB is a name or label for a pluggable database. The attribute Dictionary Store identifies a dictionary store that holds metadata in a database dictionary. One record in Database Dictionary 211 defines Pluggable Database PDA 220 and its dictionary store file PDA.DBIDC. Another record in Database Dictionary 211 defines Pluggable Database PDB 220 and its dictionary store PDB.DBIDC.

In an embodiment, the Database Dictionary 211 defines common database objects that are in effect shared by pluggable databases in Container DBMS 200. A common database object is defined in a pluggable database dictionary, which includes a reference to the common database object in the respective root database dictionary. Examples of common database objects include vendor supplied functions, utilities, tables, and views.

According to an embodiment, there are two types of common database objects: a metadata-linked object and an object-linked object. For both, metadata for the common database object is stored in the Root Database. However, for a metadata-linked object, data for the common database object, if any, is stored in a pluggable database. Thus, for a metadata-linked object, different pluggable databases may store different data for the same common database object. For an object-linked object, both the metadata and data for the database object, if any, are stored in the root database. Data for this type of common database object is the same for pluggable databases in a container database.

Seed Pluggable Database 290 contains database objects and a database dictionary. Seed Pluggable Database 290 is cloned to rapidly create a nascent pluggable database, and facilitates fast provisioning of such pluggable databases. Seed Pluggable Database 290 contains a basic set of database objects that are commonly needed and/or used. For example, Seed Database 290 may contain database object links to common database objects and views for accessing the pluggable database dictionary and other system information.

Database Dictionaries 211, 221, and 231 are expositive and illustrative of database dictionaries in a container DBMS but are not limiting.

Establishing Database Session for a Pluggable Database

Users access a pluggable database by establishing the database session for a pluggable database on the DBMS hosting the pluggable database. Before describing how to establish a database session for a pluggable database, a further description of database sessions is useful.

A database session comprises a particular connection established for a client to a database server, such as a database instance, through which the client issues a series of requests (e.g., requests for execution of database statements). The database server may maintain session state data about the session. The session state data reflects the current state of the database session and may contain the identity of the user for which the database session is established, services used by the user, instances of object types, language and character set data, statistics about resource usage for the session, temporary variable values generated by processes executing software within the database session, and storage for cursors and variables and other information. If a database dictionary has been attached to the database session, session state for the database session includes one or more references or links needed to access the attached database dictionary.

FIG. 3 depicts a procedure comprising operations that are performed particularly for establishing a database session for a pluggable database. Referring to FIG. 3, at 310, a database server hosting a container database receives a connection request, and, in conjunction with the connection request, parameter values, which include a database identifier. The database identifier may be any information that is usable to identify a database for which access is being requested. In an embodiment, the database identifier may be the name of a pluggable database. In another embodiment, the database identifier may be a database service associated with a pluggable database.

At 320, it is determined that the database connection request is a request for a database session for a pluggable database. This determination may be made by, for example, determining that the database identifier identifies pluggable database PDA.

At 330, in response to the determination that the database connection request is a request for a pluggable database, a database session for the pluggable database is established. Establishing the database session for the pluggable database includes attaching the database dictionary of the pluggable database. In the current example, the Database Dictionary 221, the database dictionary for Pluggable Database PDA 220, is established as the database dictionary for the database session.

Establishing a database session for a user entails more operations than specifically depicted in FIG. 3. Such operations include, without limitation, authentication of the user issuing the connection request and initialization of session state.

Isolation of Administration

Within Container DBMS 200, administrative privileges of a user may be isolated to a particular pluggable database or to a set of pluggable databases in Container DBMS 200. The database dictionary of a pluggable database defines users and the respective user privileges of the users. Defining administrative privileges for a user in the pluggable database dictionary grants the administrative privileges for only the pluggable database, and not for other pluggable databases or the root database. To perform administrative functions on a pluggable database, an administrative user establishes a database session for the pluggable database. The administrative user must have administrative privileges defined in the database dictionary of the pluggable database. The administrator may only add definitions for database objects to the attached database dictionary, or alter the definition of a database object already defined by the attached database dictionary. As a consequence, each pluggable database in a container database may be administered by separate a set of administrative users that may not access or even know of other pluggable databases in the container database.

Administration of a Container DBMS 200 requires administrative privileges defined by the root database. Such administrative privileges include (1) to create a pluggable database, or plug in a pluggable database into a container DBMS, and (2) to allocate container DBMS resources between pluggable databases.

In an embodiment of the present invention, a "common user" may be defined in the root database. Privileges granted to a common user apply to all and only pluggable databases. A common user may be created, assigned or unassigned privileges by issuing commands directed to the root database. There is no need to issue commands directed to each pluggable database. In an embodiment, administrative users granted privileges limited to a pluggable database are restricted from modifying or limiting the privileges of a common user, and in fact, may be restricted from viewing any information about a common user.

Transporting Pluggable Database

The architecture of a container DBMS greatly facilitates transporting databases between database servers and/or DBMSs. The tablespace files and the dictionary store may be moved between environments of a container DBMSs using readily available mechanisms for copying and moving files. The tablespace files, along with one or more dictionary files, are referred to herein collectively as a transportable database package.

Once the transportable database package of a pluggable database is moved to the environment of the target container DBMS, the pluggable database can be plugged into the target container DBMS. In an embodiment, plugging in the pluggable database is performed in response to receiving a DDL command to plug in the pluggable database, the DDL command also identifying the transportable database package. In response to receiving the DDL command, the container DBMS plugs in the pluggable database. Plugging in the pluggable database entails such operations as updating the root database dictionary to define the pluggable database, such updates including, for example, adding a record to Database_sys 203. Error checking is also performed. For example, checks are performed to ensure that the name of the pluggable database is unique within the container DBMS and that tablespace files are not already being used for other tablespaces in the container DBMS.

Advantages of a Container DBMS

A container DBMS provides advantages for database consolidation. Among such advantages is providing a high degree of isolation concurrently along with a high degree of resource sharing. Multiple pluggable databases may run on the same database server and/or database server instance, allowing the computing resources of a single database server or instance to be shared between multiple pluggable databases.

The isolation provided by a container DBMS is at existential level. The users of a database session established for a pluggable database may only access or otherwise view database objects defined via the attached pluggable database dictionary. Database objects of other pluggable databases cannot be accessed or viewed. This degree of isolation is extended to administrators.

The isolation also extends to namespaces. Each pluggable database has its own namespace for more types of database objects. With respect to each pluggable database in a container DBMS hosted on a database server, the name uniqueness requirement of tablespaces and schemas is also only confined to the pluggable database. Thus, a single DBMS or database server may have tablespaces or schemas with the same name on multiple pluggable databases. This higher degree of namespace isolation facilitates transportation of databases because the potential for name conflicts between pluggable databases is reduced if not eliminated.

Another important advantage is the fast provisioning of databases. A transportable database package of a seed pluggable database may be copied to quickly create a new pluggable database. A transportable database package of an existing pluggable database may be copied to quickly to create a clone of the pluggable database. The provisioning of a database is primarily bounded by the time required to copy files of the transportable database package and to process one or more DDL commands that require, as explained earlier, relatively little updating of metadata or other type of processing. For some file systems that support "copy on change", provisioning can be even faster and near instantaneous.

These advantages and other advantages are further explained or appreciated by comparing a container DBMS to other approaches to database consolidation.

One such approach is row-level partitioning. Under row-level partitioning, all users store data in the same database objects. Isolation is achieved, in part, by restricting user access to rows. Such isolation is enabled by rewriting queries issued by a user to contain predicate conditions that limit access to the appropriate rows.

Under row-level partitioning, all users must use the same database objects. Such a restriction is not needed to achieve database consolidation in a container database. Nor is there any need to rewrite queries to achieve isolation.

Another approach to database consolidation is the schema approach. In the schema approach, isolation is achieved by treating a schema in a "multi-schema database" as a separate "virtual database." Users are restricted to one or more schemas in the multi-schema database. The namespace for schemas and tablespaces extends over all the "virtual databases" in the multi-schema database. In addition, administrative privileges may not be isolated to a particular schema.

Transporting databases from a source DBMS to a target DBMS under the schema approach entails extracting source metadata from the database dictionary of the source multi-schema database and updating the database dictionary of the target multi-schema database with the extracted metadata. Such updating can extend over long periods of time. Container DBMSs avoid such prolonged updating.

Another approach for database consolidation is server level partitioning. Under this approach, a database is hosted by a separate database server. This approach requires a separate set of server resources for each database. With container databases, multiple pluggable databases can share the resources of a single database server.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
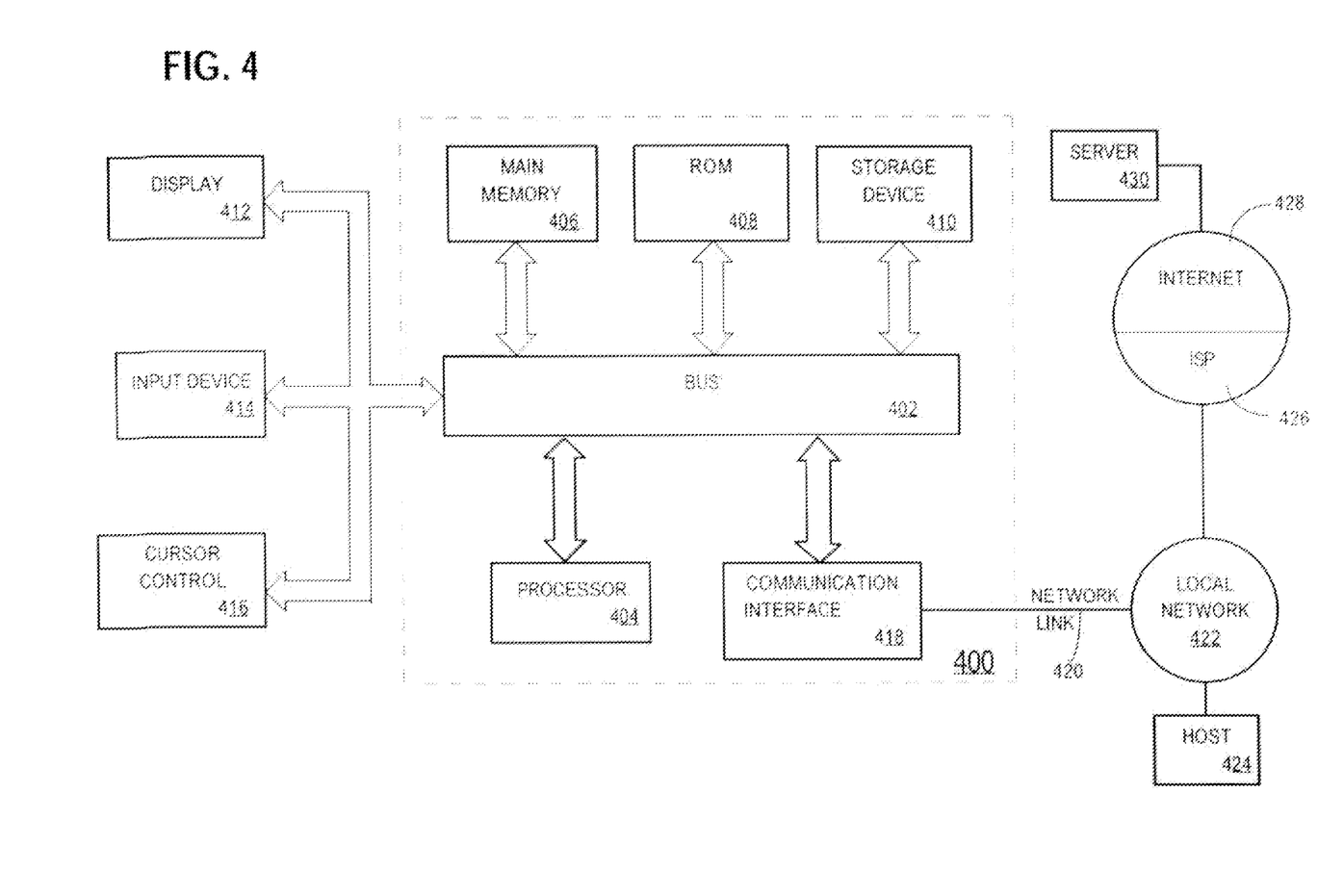
FIG. 4 is a diagram depicting a computer system that may be used in an embodiment of the present invention.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
    a database server establishing a plurality of database sessions for access to a plurality of pluggable databases in a container database, wherein said container database includes a separate database dictionary for each pluggable database of said plurality of pluggable databases, wherein said database server establishing a plurality of database sessions includes, for each database session of said plurality of database sessions:
    receiving a connection request;
    determining that the connection request is for access to a particular pluggable database of said plurality of said pluggable databases; and
    attaching the respective database dictionary of said particular pluggable database to said each database session.

2. The method of claim 1, wherein each respective database dictionary of each pluggable database of said plurality of pluggable databases is stored in a separate dictionary store.

3. The method of claim 2, wherein said separate dictionary store is a separate set of one or more files.

4. The method of claim 1, wherein said container database includes a root database dictionary, said root database dictionary defining each pluggable database of said plurality of pluggable databases.

5. The method of claim 1, wherein at least two pluggable databases of said plurality of pluggable databases each define a schema having the same schema name.

6. The method of claim 1, wherein at least two pluggable databases of said plurality of pluggable databases each define a tablespace having the same tablespace name.

7. The method of claim 1,
    wherein a first database session of said plurality of database sessions is established for access to a first pluggable database;
    wherein a second database session of said plurality of database sessions is established for access to a second pluggable database;
    wherein said container database includes a root database, said root database storing a common database object; and
    wherein the steps further include:
        executing a first query within said first database session, wherein said first query references said common database object, wherein executing said first query includes accessing said common database object; and
        executing a second query within said second database session, wherein said second query references said common database object, wherein executing said second query includes accessing said common database object.

8. The method of claim 1, further including: provisioning a particular pluggable database of said plurality of pluggable databases, by:
    copying a seed database to generate a version of said particular pluggable database; and
    then changing the respective database dictionary of said particular pluggable database.

9. The method of claim 8, said copying using copy on change.

10. One or more non-transitory computer-readable media storing sequences of instructions, which, when executed by one or more processors, cause:
    a database server establishing a plurality of database sessions for access to a plurality of pluggable databases in a container database, wherein said container database includes a separate database dictionary for each pluggable database of said plurality of pluggable databases, wherein said database server establishing a plurality of database sessions includes, for each database session of said plurality of database sessions:

receiving a connection request;
determining that the connection request is for access to a particular pluggable database of said plurality of said pluggable databases; and
attaching the respective database dictionary of said particular pluggable database to said each database session.

11. The non-transitory computer-readable media of claim 10, said sequences of instructions further comprising instructions, that when executed by said one or more processors, cause storing each respective database dictionary of each pluggable database of said plurality of pluggable databases in a separate dictionary store.

12. The non-transitory computer-readable media of claim 11, wherein said separate dictionary store is a separate set of one or more files.

13. The non-transitory computer-readable media of claim 10, wherein said container database includes a root database dictionary, said root database dictionary defining each pluggable database of said plurality of pluggable databases.

14. The non-transitory computer-readable media of claim 10, wherein at least two pluggable databases of said plurality of pluggable databases each define a schema having a same schema name.

15. The non-transitory computer-readable media of claim 10, wherein at least two pluggable databases of said plurality of pluggable databases each define a tablespace having a same tablespace name.

16. The non-transitory computer-readable media of claim 10,
wherein a first database session of said plurality of database sessions is established for access to a first pluggable database;
wherein a second database session of said plurality of database sessions is established for access to a second pluggable database;
wherein said container database includes a root database, said root database storing a common database object; and
wherein said sequences of instructions further comprise instructions, that when executed by said one or more processors, cause:
executing a first query within said first database session, wherein said first query references said common database object, wherein executing said first query includes accessing said common database object; and
executing a second query within said second database session, wherein said second query references said common database object, wherein executing said second query includes accessing said common database object.

17. The non-transitory computer-readable media of claim 10, wherein said sequences of instructions further comprise instructions, that when executed by said one or more processors, cause:
provisioning a particular pluggable database of said plurality of pluggable databases, by:
copying a seed database to generate a version of said particular pluggable database; and
then changing the respective database dictionary of said particular pluggable database.

18. The non-transitory computer-readable media of claim 17, wherein said sequences of instructions further comprise instructions, that when executed by said one or more processors, cause said copying using copy on change.

19. A system comprising:
one or more processors;
one or more non-transitory computer-readable media storing instructions, which, when executed by the one or more processors cause the system to perform operations comprising:
a database server establishing a plurality of database sessions for access to a plurality of pluggable databases in a container database, wherein said container database includes a separate database dictionary for each pluggable database of said plurality of pluggable databases, wherein said database server establishing a plurality of database sessions includes, for each database session of said plurality of database sessions:
receiving a connection request;
determining that the connection request is for access to a particular pluggable database of said plurality of said pluggable databases; and
attaching the respective database dictionary of said particular pluggable database to said each database session.

20. The system of claim 19, the instructions further comprising instructions for storing each respective database dictionary of each pluggable database of said plurality of pluggable databases in a separate dictionary store.

21. The system of claim 20, wherein said separate dictionary store is a separate set of one or more files.

22. The system of claim 19, wherein said container database includes a root database dictionary, said root database dictionary defining each pluggable database of said plurality of pluggable databases.

23. The system of claim 19, wherein at least two pluggable databases of said plurality of pluggable databases each define a schema having a same schema name.

24. The system of claim 19, wherein at least two pluggable databases of said plurality of pluggable databases each define a tablespace having a same tablespace name.

25. The system of claim 19,
wherein a first database session of said plurality of database sessions is established for access to a first pluggable database;
wherein a second database session of said plurality of database sessions is established for access to a second pluggable database;
wherein said container database includes a root database, said root database storing a common database object; and
wherein the instructions further include instructions for:
executing a first query within said first database session, wherein said first query references said common database object, wherein executing said first query includes accessing said common database object; and
executing a second query within said second database session, wherein said second query references said common database object, wherein executing said second query includes accessing said common database object.

* * * * *